(12) United States Patent
Lee et al.

(10) Patent No.: US 10,530,631 B2
(45) Date of Patent: Jan. 7, 2020

(54) PCEP EXTENSION TO SUPPORT FLEXI-GRID OPTICAL NETWORKS

(71) Applicant: Futurewei Technologies, Inc., Plano, TX (US)

(72) Inventors: Young Lee, Plano, TX (US); Haomian Zheng, Longgang District (CN)

(73) Assignee: Futurewei Techologies, Inc., Plano, TX (US)

( * ) Notice: Subject to any disclaimer, the term of this patent is extended or adjusted under 35 U.S.C. 154(b) by 0 days.

(21) Appl. No.: 15/924,984

(22) Filed: Mar. 19, 2018

(65) Prior Publication Data
US 2018/0278458 A1    Sep. 27, 2018

Related U.S. Application Data (60) Provisional application No. 62/474,249, filed on Mar. 21, 2017.

(51) Int. Cl.
| | | |
|---|---|---|
| H04J 14/02 | (2006.01) | |
| H04L 29/08 | (2006.01) | |
| H04L 12/24 | (2006.01) | |
| H04L 29/12 | (2006.01) | |

(52) U.S. Cl.
CPC .... *H04L 29/08081* (2013.01); *H04L 41/0806* (2013.01); *H04L 41/0896* (2013.01); *H04L 61/1547* (2013.01)

(58) Field of Classification Search
CPC .................................................. H04J 14/0227
See application file for complete search history.

(56) References Cited

U.S. PATENT DOCUMENTS

| | | | |
|---|---|---|---|
| 2008/0298805 A1 | 12/2008 | Lee et al. | |
| 2009/0110402 A1* | 4/2009 | Bernstein | H04J 14/0227 398/79 |
| 2012/0207467 A1 | 8/2012 | Lee | |
| 2014/0328587 A1* | 11/2014 | Magri | H04L 45/62 398/26 |

FOREIGN PATENT DOCUMENTS

| | | |
|---|---|---|
| EP | 2804353 A1 | 11/2014 |
| EP | 2858312 A1 | 4/2015 |

OTHER PUBLICATIONS

Lee et al., "PCEP Extension for WSON Routing and Wavelength Assignment", IETF, Feb. 2016 (Year: 2016).*
Bernstein et al., RFC 7689, "Signaling Extensions for Wavelength Switched Optical Networks", IETF, 2015 (Year: 2015).*

(Continued)

*Primary Examiner* — Shi K Li
(74) *Attorney, Agent, or Firm* — Schwegman Lundberg & Woessner, P.A.

(57) ABSTRACT

A computer-implemented method of requesting a path on a flexi-grid network comprises: sending, by a path computation client (PCC), a request for a path to a path computation element (PCE), the request including the request including: a label that identifies spectrum to be restricted from use in the path; and a channel spacing field; and receiving, by the PCC and from the PCE, a response to the request, the response including an identifier of an assigned path on the flexi-grid network.

19 Claims, 8 Drawing Sheets

(56) References Cited

OTHER PUBLICATIONS

Farrel et al., RFC 7699, "Generalized Labels for the Flexi-Grid in Lambda Switch Capable (LSC) Label Switching Routers", IETF, Nov. 2015 (Year: 2015).*

"International Application Serial No. PCT/CN2018/079797, International Search Report dated Jun. 11, 2018", 4 pgs.

"International Application Serial No. PCT/CN2018/079797, Wriiten Opinion dated Jun. 11, 2018", 4 pgs.

Farrel, A., et al., "Generalized Labels for the Flexi-Grid in Lambda Switch Capable (LSC) Label Switching Routers", RFC 7699, Internet Engineering Task Force (IETF), (Nov. 2015), 14 pgs.

Lee, Y., et al., "PCEP Extension for Flexible Grid Networks", PCE Working Group. [online]. Retrieved from the Internet: <URL: https://tools.ietf.org/pdf/draft-lee-pce-flexible-grid-01.pdf>, (Dec. 27, 2017), 20 pgs.

"European Application No. 18772606.2, Extended European Search Report dated Oct. 31, 2019", (dated Oct. 31, 2019), 8 pgs.

Munoz, R., et al., "Dynamic differential delay aware RMSA for elastic multi-path provisioning in GMPLS Flexi-grid DWDM networks", OFC 2014, OSA,9 Mar. 2014, pp. 1?3, (Mar. 9, 2014), 3 pgs.

Thyagaturu, Akhilesh S., et al., "Software Defined Optical Networks (SDONs): A Comprehensive Survey", EEE Communications Surveys and Tutorials, vol. 18, No. 4, (Nov. 18, 2016), 2738-2786.

* cited by examiner

PCEP EXTENSION TO SUPPORT FLEXI-GRID OPTICAL NETWORKS

RELATED APPLICATIONS

This application claims the benefit of priority under 35 U.S.C. § 119(e) to U.S. Provisional Patent Application Ser. No. 62/474,249, filed Mar. 21, 2017, which provisional application is incorporated herein by reference in its entirety.

TECHNICAL FIELD

The present disclosure is related to the path computation element protocol (PCEP) and, in particular, to PCEP extensions to support flexi-grid optical networks.

BACKGROUND

PCEP allows a path computation client (PCC) to make a request to a path computation element (PCE) for a path or set of paths through a network. The PCE returns a response to the request to the PCC. The PCE has access to the set of paths currently in use, and uses this information in determining the path or paths to assign to the requesting PCC.

Flexi-grid optical networks allow for dynamic allocation of spectrum to channels. As a result, the bandwidth assigned to nominal central channel frequencies can be dynamically adjusted. PCEP does not currently support this dynamic bandwidth allocation.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, there is provided a computer-implemented method of requesting a path on a flexi-grid network that comprises: sending, by a path computation client (PCC), a request for a path to a path computation element (PCE), the request including: a label that identifies spectrum to be restricted from use in the path; and a channel spacing field; and receiving, by the PCC and from the PCE, a response to the request, the response including an identifier of an assigned path on the flexi-grid network.

Optionally, in any of the preceding aspects, the request for the path includes a spectrum assignment method field.

Optionally, in any of the preceding aspects, the method further comprises: by the PCC, sending a second request for a second path to the PCE, the second request including a second spectrum assignment method field; receiving, by the PCC and from the PCE, a second response to the second request, the second response including an error condition that indicates that the second path could not be allocated.

Optionally, in any of the preceding aspects, the spectrum assignment method field indicates that the PCE should assign a lowest-indexed available spectrum.

Optionally, in any of the preceding aspects, the spectrum assignment method field indicates that the PCE should randomly select available spectrum.

Optionally, in any of the preceding aspects, the spectrum assignment method field indicates that the PCE may use any method of assigning available spectrum.

Optionally, in any of the preceding aspects, the request for the path includes an asymmetry field that indicates that the PCE should use the same spectrum for both directions of the path.

Optionally, in any of the preceding aspects, the request for the path includes an asymmetry field that indicates that the PCE may use different spectrum for each direction of the path.

Optionally, in any of the preceding aspects, the request for the path includes a central frequency granularity field, the central frequency granularity field to be used by the PCE in conjunction with the channel spacing field to determine spectrum for the path.

Optionally, in any of the preceding aspects, the request for the path includes a minimum slot width field to be used by the PCE in conjunction with the central frequency granularity field and the channel frequency field to determine spectrum for the path.

According to one aspect of the present disclosure, there is provided a path computation client (PCC) device that comprises: a memory storage comprising instructions; one or more processors in communication with the memory storage, wherein the one or more processors execute the instructions to perform: sending a request for a path to a path computation element (PCE), the request including: a label that identifies spectrum to be restricted from use in the path; and a channel spacing field; and receiving, from the PCE, a response to the request, the response including an identifier of an assigned path on a flexi-grid network.

Optionally, in any of the preceding aspects, the request for the path includes a spectrum assignment method field.

Optionally, in any of the preceding aspects, the PCC device further comprises: sending a second request for a second path to the PCE, the second request including a second spectrum assignment method field; receiving, from the PCE, a second response to the second request, the second response including an error condition that indicates that the second path could not be allocated.

Optionally, in any of the preceding aspects, the spectrum assignment method field indicates that the PCE should assign a lowest-indexed available spectrum.

Optionally, in any of the preceding aspects, the spectrum assignment method field indicates that the PCE should randomly select available spectrum.

Optionally, in any of the preceding aspects, the spectrum assignment method field indicates that the PCE may use any method of assigning available spectrum.

Optionally, in any of the preceding aspects, the request for the path includes an asymmetry field that indicates that the PCE should use the same spectrum for both directions of the path.

Optionally, in any of the preceding aspects, the request for the path includes an asymmetry field that indicates that the PCE may use different spectrum for each direction of the path.

Optionally, in any of the preceding aspects, the request for the path includes a central frequency granularity field, the central frequency granularity field to be used by the PCE in conjunction with the channel spacing field to determine spectrum for the path.

According to one aspect of the present disclosure, there is provided a non-transitory computer-readable medium that stores computer instructions for requesting a path on a flexi-grid network that, when executed by one or more processors, cause the one or more processors to perform steps of: sending a request for a path to a path computation element (PCE), the request including: a label that identifies spectrum to be restricted from use in the path; and a channel spacing field; and receiving, from the PCE, a response to the request, the response including an identifier of an assigned path on a flexi-grid network.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

Existing versions of PCEP allocate bandwidth on fixed channels and thus are unable to take advantage of the variable frequency size features of flexi-grid networks. As used herein, flexi-grid networks are networks based on the standards defined by the telecommunication standardization sector of the International Telecommunication Union (ITU-T) publications G.694.1 and G.872, each of which is hereby incorporated by reference in its entirety. Flexi-grid networks include a new dense wavelength division multiplexing (DWDM) grid by defining a set of nominal central frequencies, channel spacings, and frequency slots. Flexi-grid allows for a data-plane connection based on allocated, variable-sized frequency ranges within the optical spectrum, creating a flexible grid.

As disclosed herein, PCEP is extended to include new type-level-value (TLV) elements and objects that support requesting and allocating variable amounts of spectrum. As one example, a path computation request by a PCC may include a spectrum assignment object. The path computation request is defined by Internet Engineering Task Force (IETF) request for comments (RFC) 5440, hereby incorporated by reference in its entirety. Through use of these elements and objects, the modified version of PCEP is able to make use of the features of flexi-grid networks.

Figure 1:
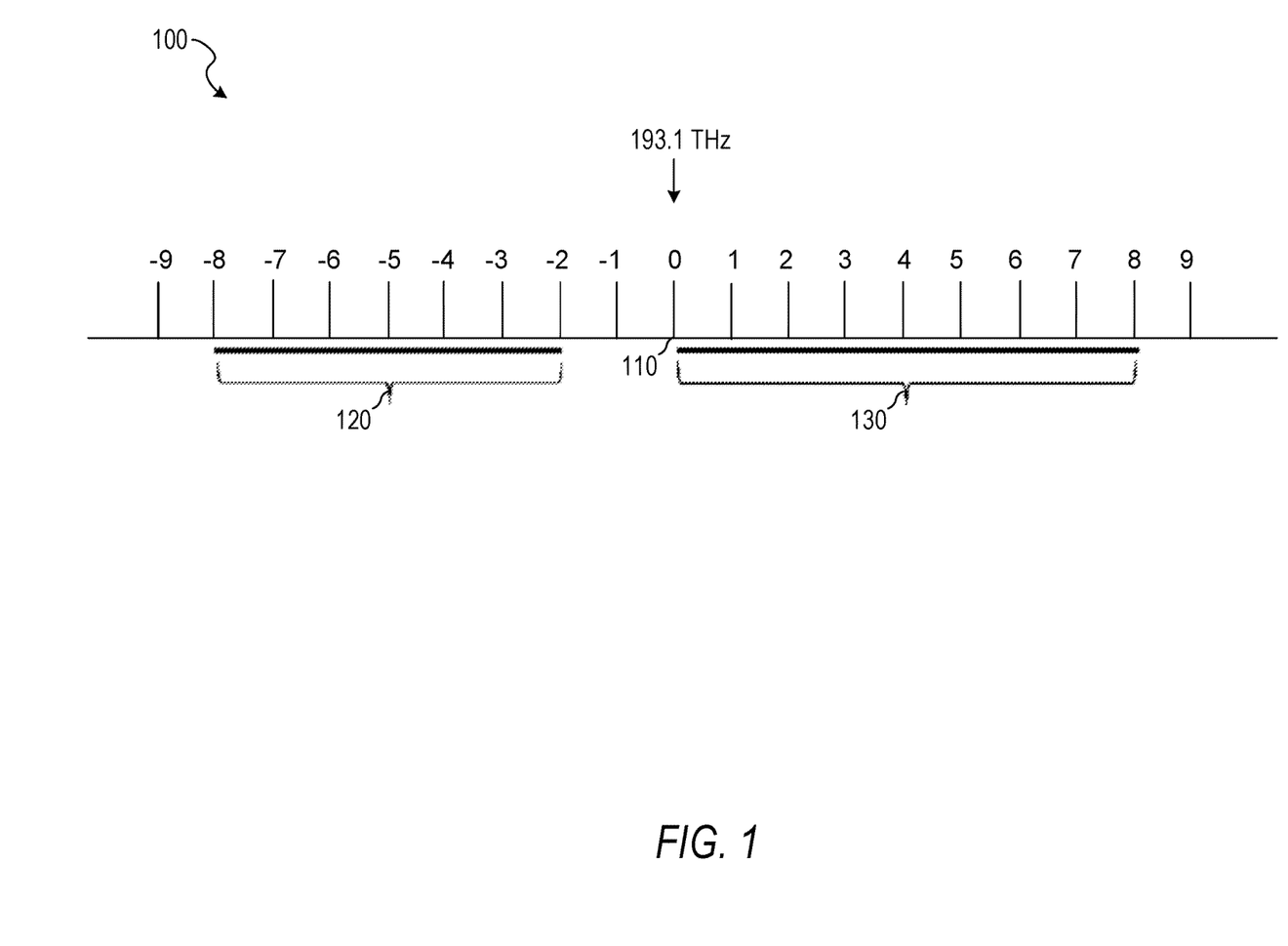
FIG. 1 is an illustration of spectrum divided between two frequency slots in a flexi-grid network, according to some example embodiments.

FIG. 1 is an illustration of spectrum 100 divided between two frequency slots 120 and 130 in a flexi-grid network, according to some example embodiments. As shown in FIG. 1, the nominal 0 channel 110 is at 193.1 THz. Numbered channels extend in both directions from the 0 channel 110, in 6.25 GHz increments. A frequency slot is a frequency range allocated to a channel and unavailable to other channels within the flexible grid. Frequency slots are defined by their central frequency and the slot width. In FIG. 1, frequency slot 120 has a central frequency of 193.06875 THz (corresponding to channel −5) and a slot width of 37.5 GHz. Frequency slot 130 has a central frequency of 193.125 THz (corresponding to channel 4) and a slot width of 50 GHz. The frequency slots have a slot width that is a multiple of 12.5 GHz. The frequency slots are dense wavelength division multiplexing (DWDM) links. In DWDM, multiple signals are transmitted simultaneously using the same fiber. The multiple signals are distinguishable because they use distinct frequencies.

Figure 2:
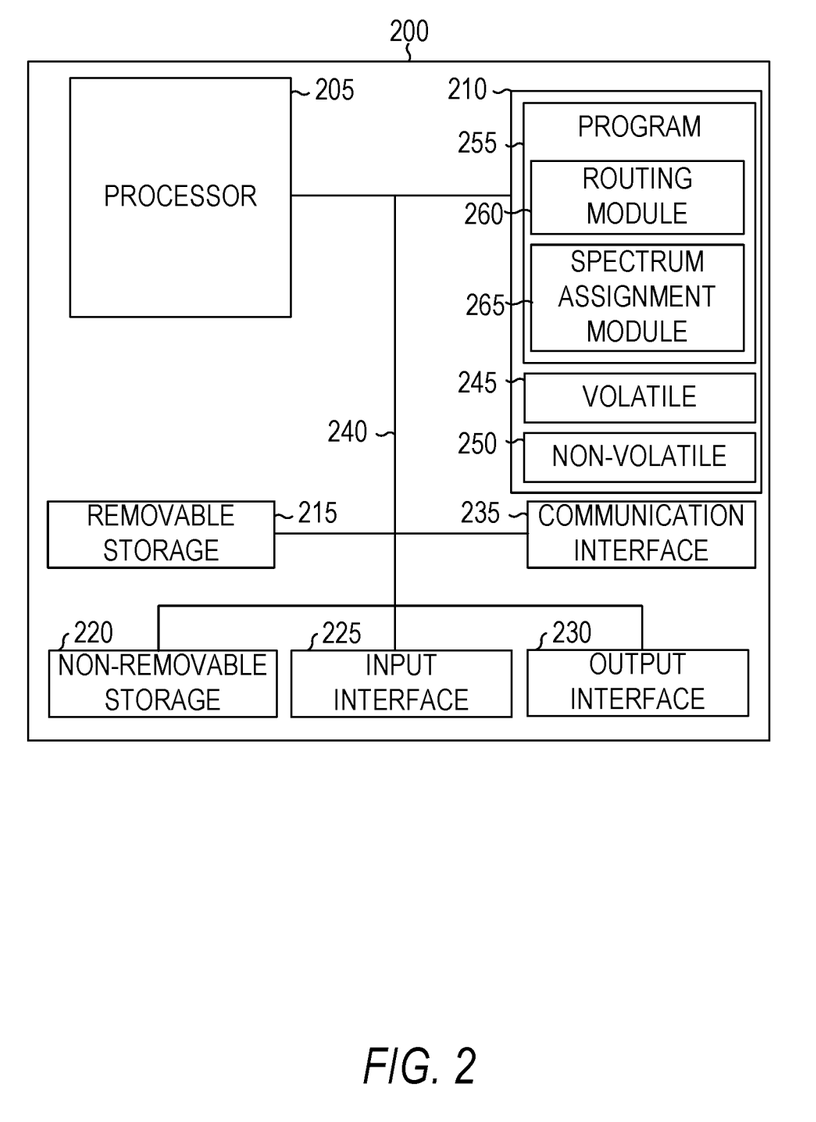
FIG. 2 is a block diagram illustrating circuitry for clients and servers that implement algorithms and perform methods, according to some example embodiments.

FIG. 2 is a block diagram illustrating circuitry for implementing algorithms and performing methods, according to example embodiments. All components need not be used in various embodiments. For example, the clients, servers, and cloud-based network resources may each use a different set of components, or in the case of servers, for example, larger storage devices.

One example computing device in the form of a computer 200 (also referred to as computing device 200 and computer system 200) may include a processor 205, memory storage 210, removable storage 215, non-removable storage 220, input interface 225, output interface 230, and communication interface 235, all connected by a bus 240. Although the example computing device is illustrated and described as the computer 200, the computing device 200 may be in different forms in different embodiments. For example, the computing device 200 may instead be a smartphone, a tablet, a smartwatch, or another computing device including elements the same as or similar to those illustrated and described with regard to FIG. 2. Devices, such as smartphones, tablets, and smartwatches, are generally collectively referred to as "mobile devices" or "user equipment". Further, although the various data storage elements are illustrated as part of the computer 200, the storage may also or alternatively include cloud-based storage accessible via a network, such as the Internet, or server-based storage.

The memory storage 210 may include volatile memory 245 and non-volatile memory 250, and may store a program 255. The computer 200 may include—or have access to a computing environment that includes—a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 may include or have access to a computing environment that includes input interface 225, output interface 230, and a communication interface 235. The output interface 230 may be an interface to a display device, such as a touchscreen, that also may serve as an input device. The input interface 225 may be an interface to one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may include a local area network (LAN), a wide area network (WAN), a cellular network, a WiFi network, a Bluetooth network, or other networks.

Computer-readable instructions stored on a computer-readable medium (e.g., the program 255 stored in the memory 210) are executable by the processor 905 of the computer 200. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 255 may implement the method 800 (discussed below with respect to FIG. 8) or other methods using modules such as a communication module, a routing module 260, and a spectrum assignment module 265. Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The routing module 260 determines a route through a network in response to a request. For example, a request may indicate a source and a destination and the routing module 260 may determine a series of reconfigurable optical add drop multiplexers (ROADMs) that provide a route through the network that allows data to be transferred to the destination from the source.

The spectrum assignment module 265 assigns spectrum in a flexi-grid network to a route determined by the routing module 260. For example, the frequency slot 120 or the frequency slot 130 may be assigned to the route.

Figure 3:
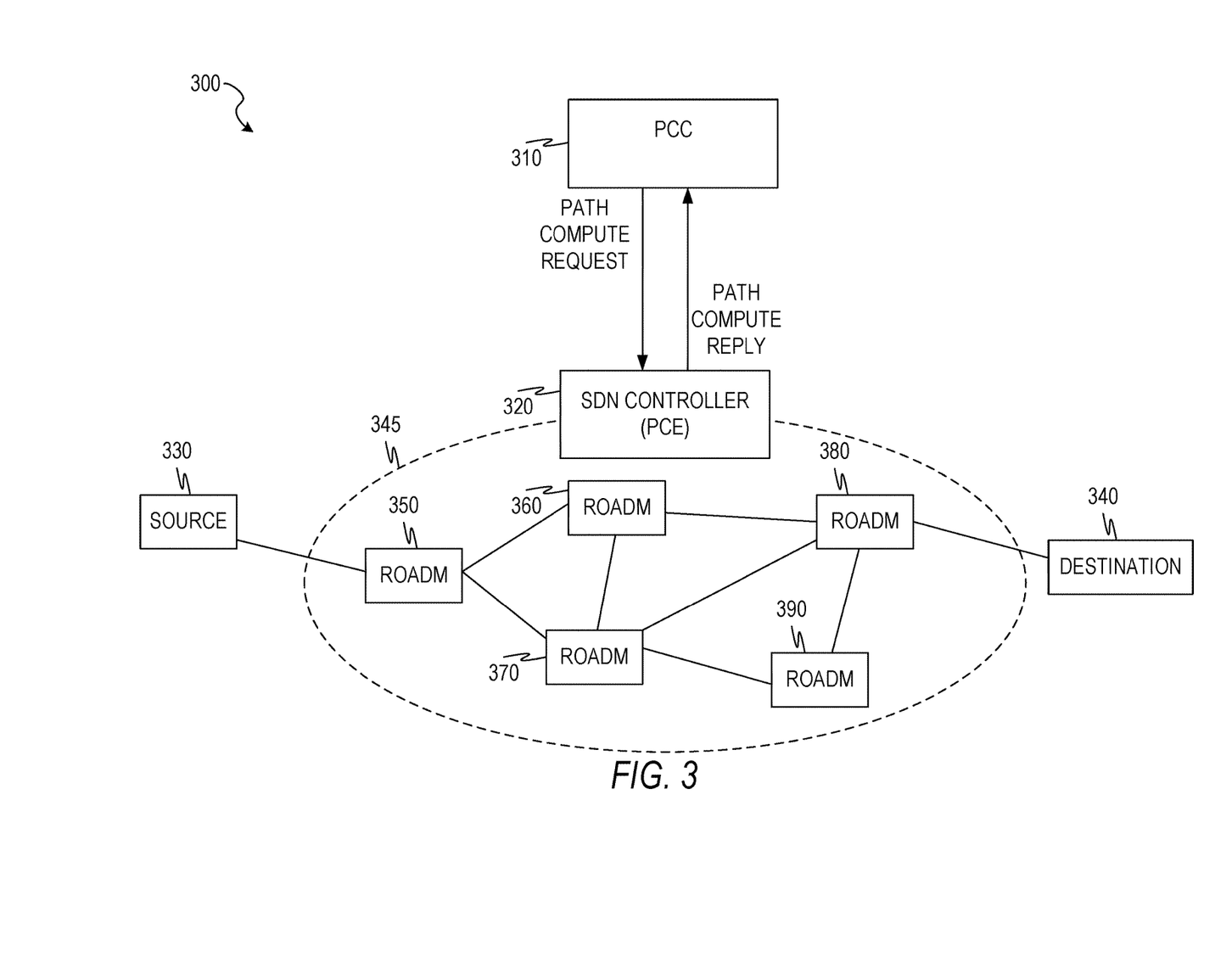
FIG. 3 is a block diagram illustration of a network suitable for using a PCEP extension to support flexi-grid networks, according to some example embodiments.

FIG. 3 is a block diagram illustration 300 of a network suitable for using a PCEP extension to support flexi-grid networks, according to some example embodiments. The network of FIG. 3 includes a PCC 310, a PCE 320 in the form of a software defined networking (SDN) controller, a source 330, a destination 340, and a flexi-grid network 345 including reconfigurable optical add drop multiplexers (ROADMs) 350, 360, 370, 380, and 390 connected via optical fibers. The PCC 310 may send a path computation request to the PCE 320. The path computation request may identify the source and the destination to be connected by the requested path and include information regarding requested spectrum for the requested path. The PCE may receive the path request and allocate a route via the ROADMs 350-390 in the flexigrid network 345 that connects the source and the destination. The path through the flexigrid network 345 includes an allocation of spectrum along each link. The PCE responds to the path computation request with a path computation reply that indicates the allocated route and allocated spectrum.

As described in IETF RFC 5440, the format of a path computation request (also referred to as a PCReq message), is below. Each of the referenced element types not defined below is defined in IETF RFC 5440.

```
<PCReq Message>::= <Common Header>
                   [<svec-list>]
                   <request-list>
``` where:

```
<svec-list>::=<SVEC>[<svec-list>]
<request-list>::=<request>[<request-list>]
<request>::= <RP>
   <END-POINTS>
   [<LSPA>]
   [<BANDWIDTH>]
   [<metric-list>]
   [<RRO>[<BANDWIDTH>]]
   [<IRO>]
   [<LOAD-BALANCING>]
``` where:
<metric-list>::=<METRIC>[<metric-list>].

In some example embodiments, the <request> is redefined to additionally include a <Spectrum Assignment> object, described below with respect to FIG. 7.

Any of the machines or devices shown in FIG. 3 may be implemented in a general-purpose computer modified (e.g., configured or programmed) by software to be a special-purpose computer to perform the functions described herein for that machine, database, or device. For example, a computer system able to implement any one or more of the methodologies described herein is discussed above with respect to FIG. 2. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 3 may be combined into a single machine, database, or device, and the functions described herein for any single machine, database, or device may be subdivided among multiple machines, databases, or devices.

Figure 4:
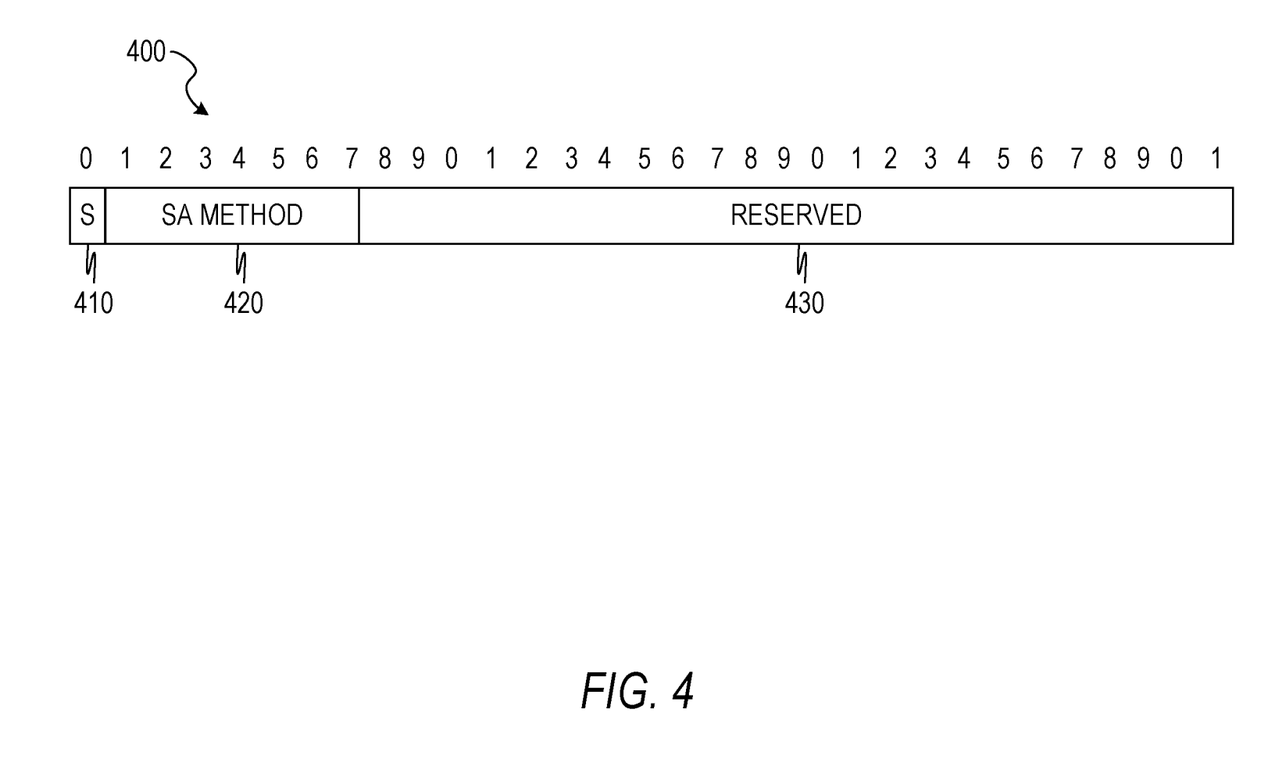
FIG. 4 is a block diagram illustration of a spectrum selection type-length-value suitable for use in a PCEP extension to support flexi-grid networks, according to some example embodiments.

FIG. 4 is a block diagram illustration of a spectrum selection type-length-value (TLV) 400 suitable for use in a PCEP extension to support flexi-grid networks, according to some example embodiments. The spectrum selection TLV 400 is a 32-bit value that includes three fields: asymmetry field 410 (1 bit), spectrum assignment method field 420 (7 bits) and reserved field 430 (24 bits). The bits of the reserved field 430 should be set to 0. The spectrum selection TLV 400 may be included by a path computation request made by a PCC.

The asymmetry field 410 bit is set to 0 to indicate that the same spectrum is required in both directions of the path (i.e., from the source to the destination and from the destination to the source). The asymmetry field 410 bit is set to 1 to indicate that different spectrum may be used in each direction of the path.

The spectrum assignment (SA) method field 420 has a range of 0-128, as a 7-bit value. An SA method of 0 indicates that the PCE may use any method of spectrum assignment.

An SA method of 1 indicates a request that the PCE use the lowest-indexed spectrum available. For example, the PCE may maintain a table that maps an index to each channel of FIG. 1. The order of the indices may correspond to the order of the channels (e.g., such that frequency slot 1 would have a lower index than frequency slot 2 since the channel of frequency slot 1 (−5) is lower than the channel of frequency slot 2 (4)).

An SA method value of 2 instructs the PCE to choose available spectrum randomly. Other values of the SA method may produce undefined results or be treated as a value of 0. When the spectrum selection TLV 400 is not present, the PCE may allocate spectrum as if an S value of 1 and an SA method of 0 were provided.

Figure 5:
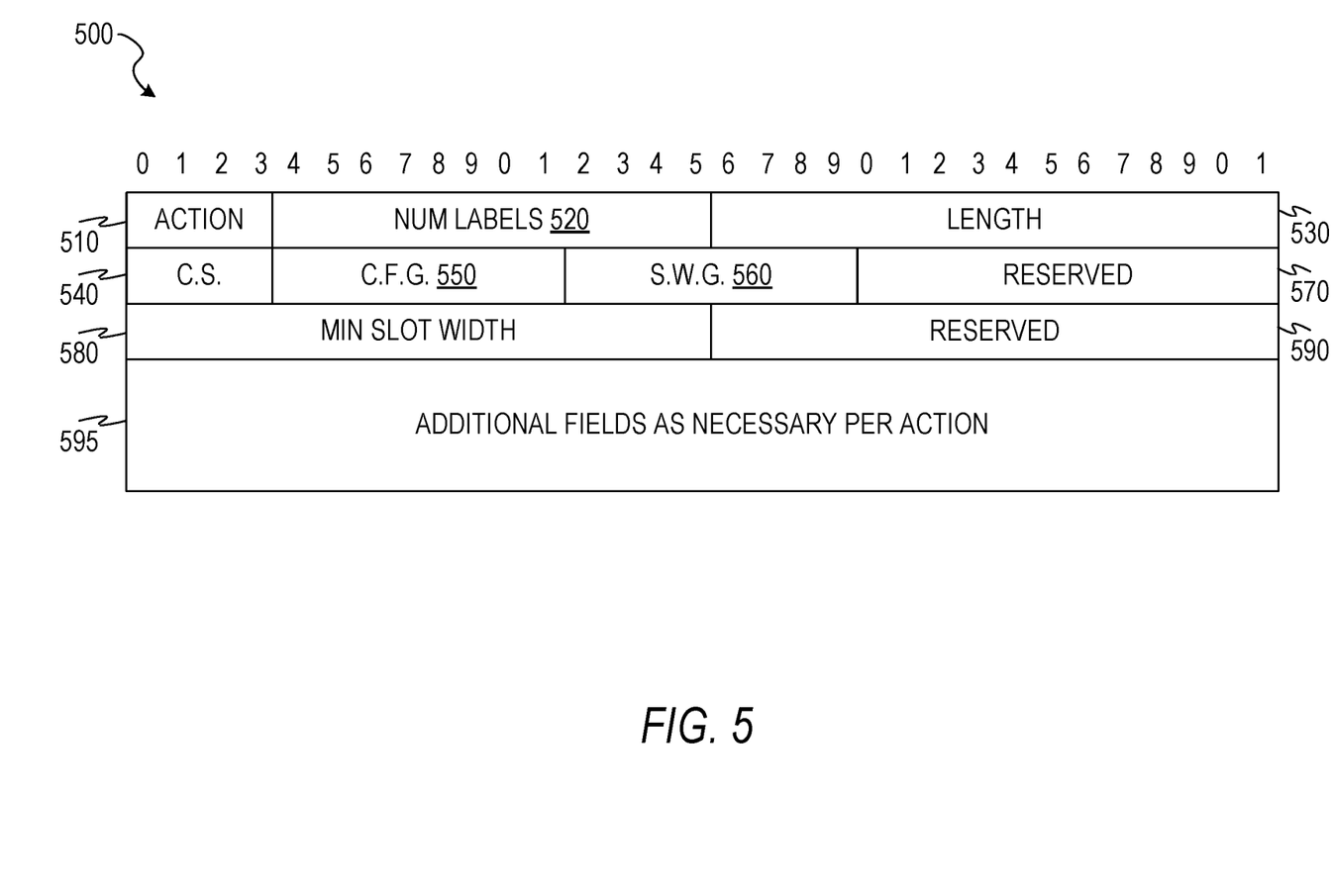
FIG. 5 is a block diagram illustration of a spectrum restriction type-length-value suitable for use in a PCEP extension to support flexi-grid networks, according to some example embodiments.

FIG. 5 is a block diagram illustration of a spectrum restriction TLV 500 suitable for use in a PCEP extension to support flexi-grid networks, according to some example embodiments. The spectrum restriction TLV 500 includes nine fields, plus additional fields as necessary depending on the action indicated in the action field. The nine fields are an action field 510, a number of labels field 520, a length field 530, a channel spacing field 540, a central frequency granularity (CFG) field 550, a slot width granularity (SWG) field 560, a minimum slot width field 580, and two reserved fields 570 and 590. Additional label fields 595 may also be included in the TLV 500.

The four-bit action field 510 indicates whether the spectrum restriction TLV 500 indicates spectrum to be included or excluded when the PCE selects spectrum to allocate and indicates whether the spectrum will be identified as a list or as a range.

The twelve-bit number of labels field 520 indicates the number of label TLVs supplied as additional fields. In some example embodiments, each label TLV indicates a frequency value. Thus, two labels may be used to define a range, or 0-4095 labels may be used in a list of frequency values, depending on the value of the action field.

The sixteen-bit length field 530 indicates the total number of octets of the spectrum restriction TLV. The nine fixed fields occupy 12 octets, so the valid range of the length field is 12-65535.

The four-bit channel spacing field 540 indicates the spacing between channels. The channel spacing field 540 has valid values defined by IETF RFC 6205 and IETF RFC 7699, each of which are hereby incorporated by reference in their entireties. For flexi-grid, a channel spacing value of five, indicating a channel spacing of 6.25 GHz is used. The central frequency of a channel is 193.1 THz+n×channel spacing, where n is the channel number.

The eight-bit CFG field 550 indicates the multiple of the channel spacing to be used for central frequency granularity. For example, when the CFG is one, the central frequencies may be separated by the channel spacing. When the CFG is larger than one, the central frequencies are spaced farther apart.

The eight-bit SWG field 560 indicates the multiple of double the channel spacing to be used for slot width granularity. For example, when the SWG is one and the channel spacing is 6.25 GHz, slots will be a multiple of 12.5 GHz in size.

The sixteen-bit minimum slot width field 580 indicates the minimum slot width as a multiple of the SWG. The two reserved fields consume twelve and sixteen bits, respectively, and should be set to 0.

As indicated above with respect to the number of labels field, additional label fields 595 (defined using the Generic Label TLV of IETF RFC 3036, which is hereby incorporated by reference in its entirety) are appended to the spectrum restriction TLV to indicate the spectrum affected by the action.

The spectrum restriction TLV may be used in a spectrum restriction constraint object, described as:

<Spectrum Restriction Constraint> ::=
    <Action> <Count> <Reserved>
    (<Link Identifiers> <Spectrum Restriction>)...

Where
<Link Identifiers>::=<Link Identifier>[<Link Identifiers>]

Figure 6:
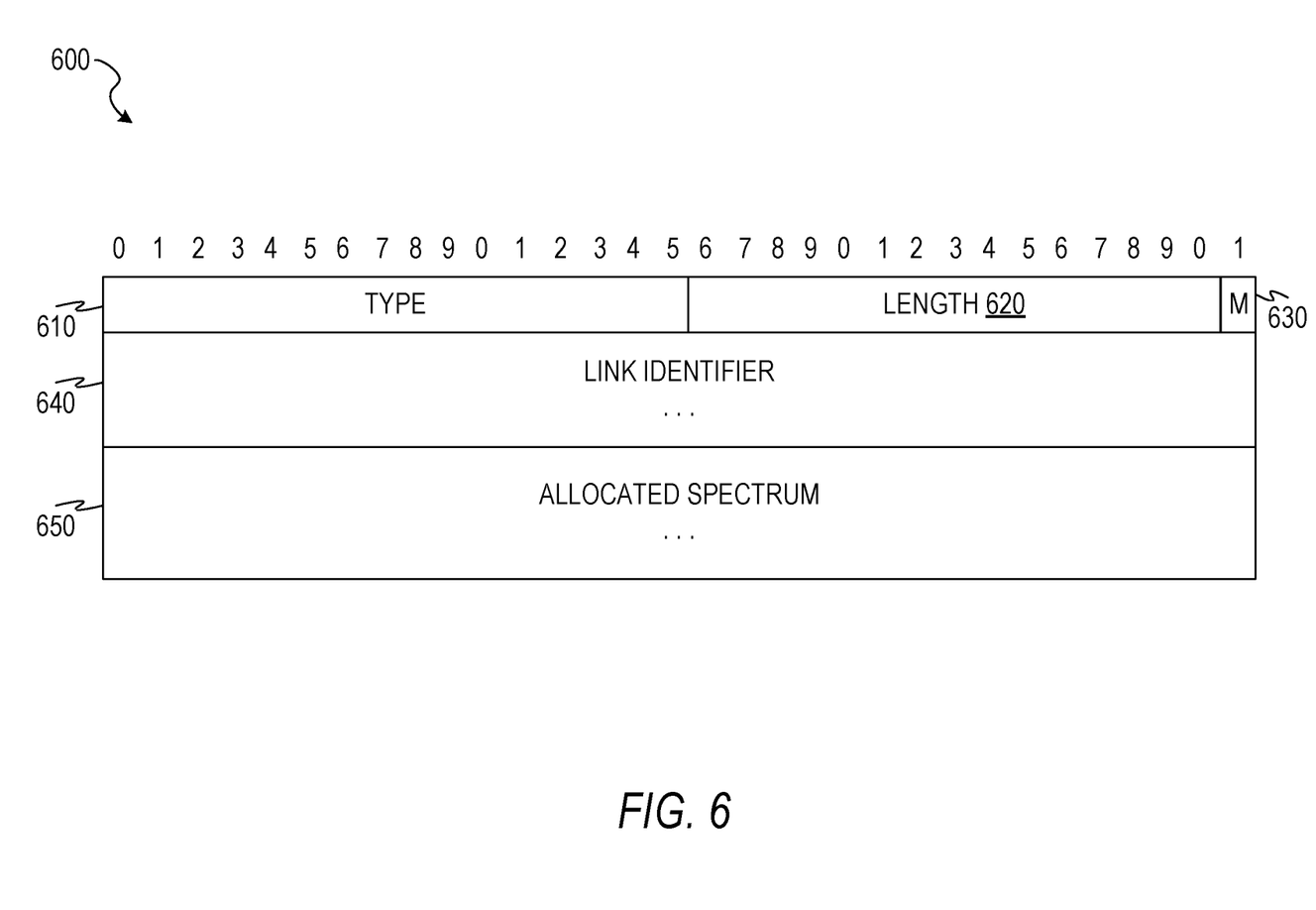
FIG. 6 is a block diagram illustration of a spectrum allocation type-length-value suitable for use in a PCEP extension to support flexi-grid networks, according to some example embodiments.

FIG. 6 is a block diagram illustration of a spectrum allocation TLV 600 suitable for use in a PCEP extension to support flexi-grid networks, according to some example embodiments. The spectrum allocation TLV 600 includes a type field 610 (i.e., the type of the type-length-value field), a length field 620, an explicit label control mode field 630 (labeled "M"), a link identifier field 640, and an allocated spectrum field 650. The spectrum allocation TLV 600 may be provided by a PCE to a PCC as part of a path computation reply in a request parameters (RP) object.

The fifteen-bit length field 620 contains the number of octets of the spectrum allocation TLV. The link identifier field 640 contains one or more 32-bit identifiers. Each 32-bit identifier identifies a link along the allocated route.

The one-bit explicit label control mode field 630 is set if the PCE should calculate an explicit assignment of the label that will be used for each node of the path. The explicit label control mode field 630 is cleared if the PCE should return the result of the label list from which each node along the path chooses as it fits.

The allocated spectrum field 650 contains one or more 32-bit identifiers. Each 32-bit identifier identifies spectrum allocated to the corresponding link. For example, the first spectrum identifier in the list of allocated spectrum values corresponds to the first link identifier in the list of link values.

Figure 7:
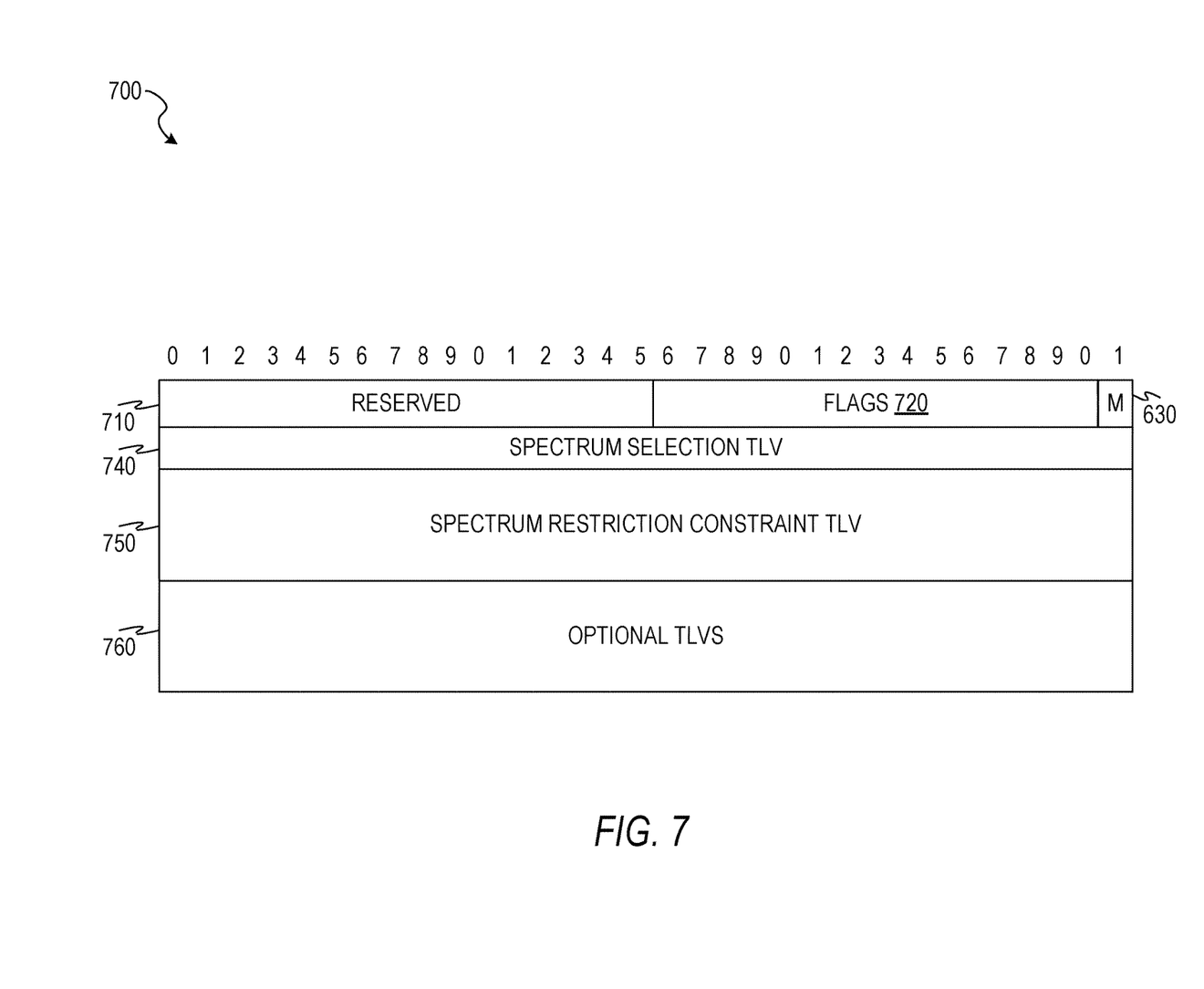
FIG. 7 is a block diagram illustration of a spectrum assignment object suitable for use in a PCEP extension to support flexi-grid networks, according to some example embodiments.

FIG. 7 is a block diagram illustration of a spectrum assignment object 700 suitable for use in a PCEP extension to support flexi-grid networks, according to some example embodiments. The spectrum assignment object includes a sixteen-bit reserved field 710, a fifteen-bit flags field 720, a one-bit explicit label control mode field 630, a 32-bit spectrum selection TLV 740 (e.g., an instance of the TLV 400), a variable-length spectrum restriction TLV 750 (e.g., an instance of the TLV 500), and a variable number of optional TLVs 760. The explicit label control mode field 630 is described above, with respect to FIG. 6.

The spectrum selection TLV 740 identifies a spectrum allocation method suggestion by the PCC to the PCE. The PCE may use the suggested spectrum allocation method to allocate spectrum in response to a spectrum assignment request comprising the spectrum assignment object 700. The spectrum restriction TLV 750 identifies one or more spectrum restrictions (e.g., due to tunable laser or other management restrictions). For example, the TLV 750 may include one or more labels (as indicated by the number of labels field 520), each label included as an additional label field 595, and identifying a frequency to be allocated or excluded from allocation (e.g., based on the value of the action field 510). In some example embodiments, a pair of labels identifies a range of frequencies to be allocated or excluded from allocation.

Figure 8:
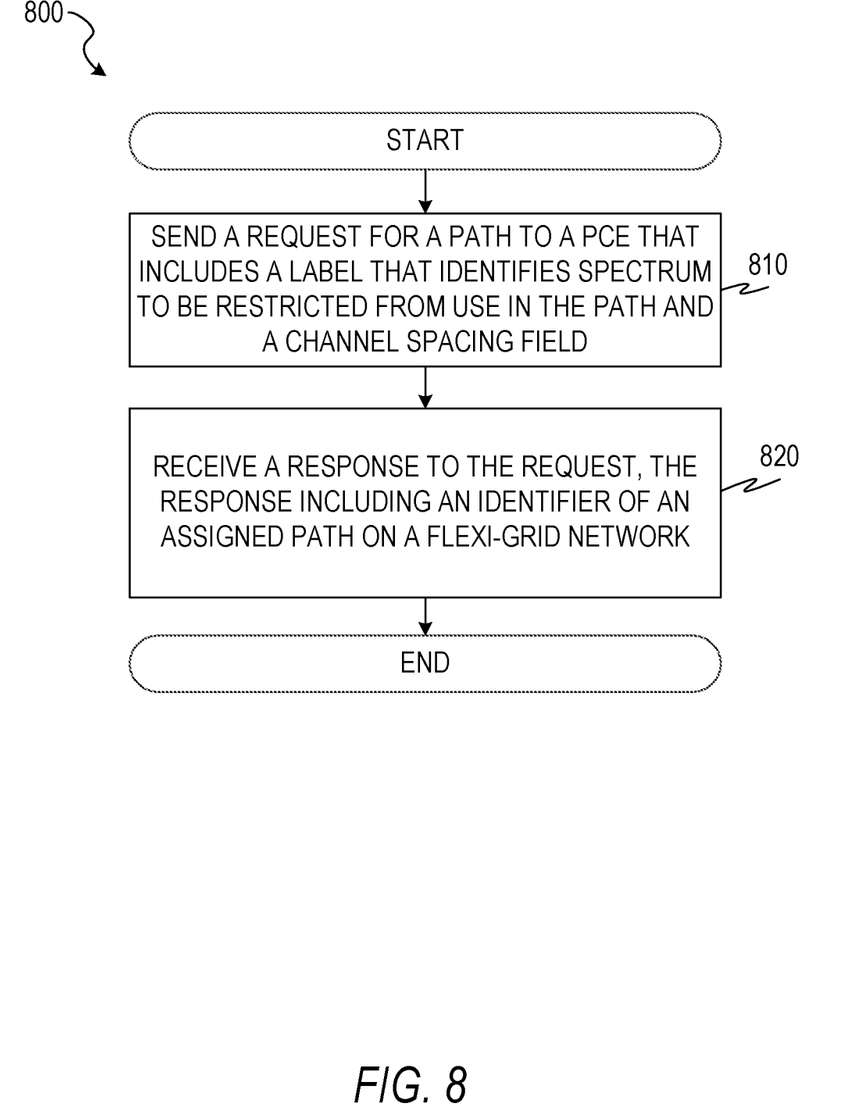
FIG. 8 is a flowchart illustration of a method of using a PCEP extension that supports flexi-grid networks, according to some example embodiments.

FIG. 8 is a flowchart illustration of a method 800 of using a PCEP extension that supports flexi-grid networks, according to some example embodiments. The method 800 includes operations 810 and 820 and is described, by way of example and not limitation, as being performed by the PCC of FIG. 3.

In operation 810, the PCC sends a request for a path to a PCE, wherein the request includes a label that identifies spectrum to be restricted from use in the path and a channel spacing field. For example, the spectrum assignment object 700, may be sent as part of a path computation request by the PCC. As described above with respect to FIGS. 5 and 7, the spectrum assignment object 700 includes a spectrum restriction constraint TLV 750, which may be implemented as an instance of the spectrum restriction TLV 500, including the number of labels field 520 to indicate the number of labels, the additional fields 595 to contain the labels, and the channel spacing field 540.

In operation 820, the PCC receives a response to the request, wherein the response includes an identifier of an assigned path on a flexi-grid network. For example, the spectrum allocation TLV 600 may be sent from the PCE to the PCC, wherein at least one of the link identifiers 640 identifies a link on a flexi-grid network (e.g., the flexi-grid network of FIG. 3).

If the PCC is not capable of processing the request for the path due to insufficient memory, the PCE sends a PCEP error message (defined by IETF RFC 5440) with a PCEP-ERROR object (also defined by IETF RFC 5440) and an Error-value (e.g., 1). The PCE stops processing the request. In response to the PCEP error message, the PCC cancels the request for the path.

If the PCC is not capable of processing the request for the path because it is not enabled to perform spectrum allocation, the PCE sends a PCEP error message with a PCEP-ERROR object and a different Error-value (e.g., 2). The PCE stops processing the request. In response to the PCEP error message, the PCC cancels the request for the path.

In some example embodiments, the PCEP error message includes a NO-PATH object (defined by IETF RFC 5440) to communicate one or more reasons for not being able to perform spectrum allocation for the request for the path. The NO-PATH object may include a NO-PATH-VECTOR TLV (also defined by IETF RFC 5440) to provide additional information about why the request for the path could not be successfully handled by the PCE. The NO-PATH-VECTOR TLV includes 32-bits, each of which can be used to identify a specific cause of the failure to generate a path. As defined by the IETF RFC 5440, only bits 29-31 have assigned meanings, with the remaining 28 bits available for future assignments. In some example embodiments, one of the 28 bits is assigned to indicate that no feasible route was found that meets all of the constraints (e.g., spectrum restrictions) associated with the request for the path.

Devices and methods disclosed herein may enable the use of PCEP on flexi-grid networks. Devices and methods disclosed herein may also result in improved allocation of network resources, resulting in improved throughput and quality of service. By enabling clients to make a flexi-grid specific path computation that is not tied with a fixed frequency, the effective bandwidth for the path can be flexibly increased. Furthermore, when the bandwidth desired by a client is greater than the fixed slot width that would be granted by prior art PCEP, the devices and methods disclosed herein enable the client to request a path with the desired bandwidth.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method of requesting a path on a flexi-grid network comprising:
   sending, by a path computation client (PCC), a request for a path to a path computation element (PCE), the request including:
   a label that identifies spectrum to be restricted from use in the path;
   a channel spacing field;
   a slot width granularity field; and
   a minimum slot width field, the slot width granularity field and the minimum slot width field to be used by the PCE in conjunction with the channel spacing field to determine spectrum for the path; and
   receiving, by the PCC and from the PCE, a response to the request, the response including an identifier of an assigned path on the flexi-grid network.

2. The computer-implemented method of claim 1, wherein the request for the path includes a spectrum assignment method field.

3. The computer-implemented method of claim 2, further comprising:
- by the PCC, sending a second request for a second path to the PCE, the second request including a second spectrum assignment method field; and
- receiving, by the PCC and from the PCE, a second response to the second request, the second response including an error condition that indicates that the second path could not be allocated.

4. The computer-implemented method of claim 2, wherein the spectrum assignment method field indicates that the PCE should assign a lowest-indexed available spectrum.

5. The computer-implemented method of claim 2, wherein the spectrum assignment method field indicates that the PCE should randomly select available spectrum.

6. The computer-implemented method of claim 2, wherein the spectrum assignment method field indicates that the PCE may use any method of assigning available spectrum.

7. The computer-implemented method of claim 1, wherein the request for the path includes an asymmetry field that indicates that the PCE should use the same spectrum for both directions of the path.

8. The computer-implemented method of claim 1, wherein the request for the path includes an asymmetry field that indicates that the PCE may use different spectrum for each direction of the path.

9. The computer-implemented method of claim 1, wherein the request for the path includes a central frequency granularity field, the central frequency granularity field to be used by the PCE in conjunction with the slot width granularity field, the minimum slot width field, and the channel spacing field to determine spectrum for the path.

10. A path computation client (PCC) device comprising:
- a memory storage comprising instructions;
- one or more processors in communication with the memory storage, wherein the one or more processors execute the instructions to perform:
  - sending a request for a path to a path computation element (PCE), the request including:
    - a label that identifies spectrum to be restricted from use in the path;
    - a channel spacing field;
    - a slot width granularity field; and
    - a minimum slot width field, the slot width granularity field and the minimum slot width field to be used by the PCE in conjunction with the channel spacing field to determine spectrum for the path; and
  - receiving, from the PCE, a response to the request, the response including an identifier of an assigned path on a flexi-grid network.

11. The PCC device of claim 10, wherein the request for the path includes a spectrum assignment method field.

12. The PCC device of claim 11, further comprising:
- sending a second request for a second path to the PCE, the second request including a second spectrum assignment method field; and
- receiving, from the PCE, a second response to the second request, the second response including an error condition that indicates that the second path could not be allocated.

13. The PCC device of claim 11, wherein the spectrum assignment method field indicates that the PCE should assign a lowest-indexed available spectrum.

14. The PCC device of claim 11, wherein the spectrum assignment method field indicates that the PCE should randomly select available spectrum.

15. The PCC device of claim 11, wherein the spectrum assignment method field indicates that the PCE may use any method of assigning available spectrum.

16. The PCC device of claim 10, wherein the request for the path includes an asymmetry field that indicates that the PCE should use the same spectrum for both directions of the path.

17. The PCC device of claim 10, wherein the request for the path includes an asymmetry field that indicates that the PCE may use different spectrum for each direction of the path.

18. The PCC device of claim 10, wherein the request for the path includes a central frequency granularity field, the central frequency granularity field to be used by the PCE in conjunction with the slot width granularity field, the minimum slot width field, and the channel spacing field to determine spectrum for the path.

19. A non-transitory computer-readable medium storing computer instructions for requesting a path on a flexi-grid network, that when executed by one or more processors, cause the one or more processors to perform steps of:
- sending a request for a path to a path computation element (PCE), the request including:
  - a label that identifies spectrum to be restricted from use in the path;
  - a channel spacing field;
  - a slot width granularity field; and
  - a minimum slot width field: and
- receiving, from the PCE, a response to the request, the response including an identifier of an assigned path on the fled-grid network.

* * * * *

UNITED STATES PATENT AND TRADEMARK OFFICE
CERTIFICATE OF CORRECTION

PATENT NO. : 10,530,631 B2  
APPLICATION NO. : 15/924984  
DATED : January 7, 2020  
INVENTOR(S) : Lee et al.

Page 1 of 1

It is certified that error appears in the above-identified patent and that said Letters Patent is hereby corrected as shown below:

On the Title Page

Item (73), in "Assignee", in Column 1, Line 1, delete "Techologies," and insert --Technologies,-- therefor In the Claims In Column 12, Line 49, in Claim 19, delete "fled-grid" and insert --flexi-grid-- therefor Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*